United States Patent [19]

Cheng et al.

[11] 3,820,958

[45] June 28, 1974

[54] HYDROGEN SULFIDE MONITOR

[75] Inventors: Chin Huan Cheng; Bruce C. Peters, both of Midland, Mich.

[73] Assignee: The Dow Chemical Company, Midland, Mich.

[22] Filed: Jan. 29, 1973

[21] Appl. No.: 327,394

[52] U.S. Cl. .............. 23/232 E, 23/254 E, 73/23, 324/65 P, 338/34, 340/237
[51] Int. Cl. .................... G01n 27/62, G01r 27/02
[58] Field of Search ........... 324/65 P, 71 R, 71 SN; 338/34; 73/27 R, 23; 23/232 E, 254 E; 340/237

[56] References Cited
UNITED STATES PATENTS

| | | | |
|---|---|---|---|
| 3,045,198 | 7/1962 | Dolan et al. | 324/65 P |
| 3,138,948 | 6/1964 | Pfefferle | 73/27 R |
| 3,437,446 | 4/1969 | Pierce | 23/232 E |
| 3,479,257 | 11/1969 | Shaver | 338/34 |
| 3,549,329 | 12/1970 | Silverman et al. | 23/254 E |
| 3,567,383 | 3/1971 | Langley et al. | 73/27 X |
| 3,714,562 | 1/1973 | McNerney | 324/65 R |

Primary Examiner—Stanley T. Krawczewicz
Attorney, Agent, or Firm—Earl D. Ayers

[57] ABSTRACT

Apparatus and method for determining the presence of hydrogen sulfide in a gas mixture such as air even at or near room temperature at low parts per million or at higher levels. Silver is deposited on a thin dielectric film, then exposed to the hydrogen sulfide containing gas mixture. The electrical resistance across the film before and after exposure to hydrogen sulfide, plus the time exposed, are utilized in determining the amount of hydrogen sulfide present.

An apparatus utilizing standardized films provides direct reading hydrogen sulfide content results.

3 Claims, 2 Drawing Figures

HYDROGEN SULFIDE MONITOR

BACKGROUND OF THE INVENTION

This invention relates to an apparatus and method for determining the presence of hydrogen sulfide in gas mixtures even at or near room temperature, and particularly to such an apparatus and method which is capable of detecting the presence of hydrogen sulfide at the level of a few parts per million or higher levels.

A need exists for a simple, more sensitive means to measure the presence of hydrogen sulfide in a gas mixture such as air.

The so-called lead acetate colorimetric method is sensitive only to about 6 to 40 parts per million.

In addition, many systems for determining the presence of hydrogen sulfide in gas mixtures are not readily adaptable to portable or field usage.

A need also exists for a simple, portable instrument for providing a direct indication of the concentration of hyrogen sulfide in a gas mixture such as air.

OBJECTS OF THE INVENTION

A principal object of this invention is to provide an improved apparatus and/or method for determining the presence of hydrogen sulfide at the few parts per million or higher levels.

Another object of this invention is to provide a simple, easy to use portable apparatus for determining the presence of hydrogen sulfide at the few parts per million or higher levels.

A further object of this invention is to provide a simple, reliable and economical instrument for determining the presence of hydrogen sulfide in a gas mixture such as air.

STATEMENT OF INVENTION

In accordance with this invention, there is provided an apparatus and method for determining the presence of hydrogen sulfide in a gas mixture such as air at or near room temperature at low parts per million or higher levels. Silver is deposited on a dielectric film, then exposed to the hydrogen sulfide containing gas mixture. The electrical resistance across the film before and after exposure to hydrogen sulfide, plus the time exposed, are utilized in determining the amount of hydrogen sulfide present.

An apparatus, including a resistance measuring meter, utilizing standardized films provides direct reading hydrogen sulfide content results.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 1:
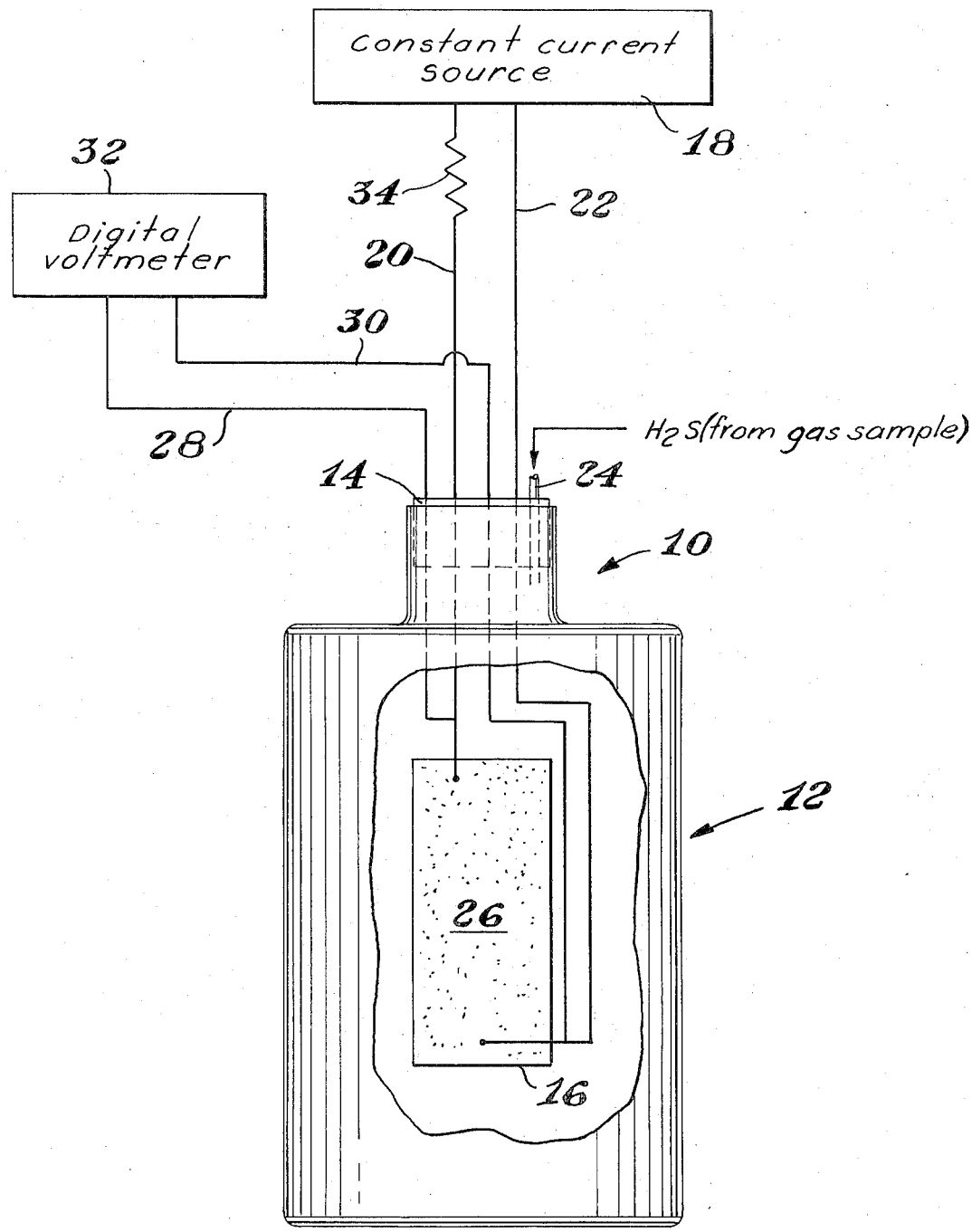
FIG. 1 is a diagrammatical view of apparatus in accordance with this invention.

Referring to the drawing, particularly to FIG. 1, there is shown apparatus, indicated generally by the numeral 10 which includes a walled container 12 having a sealable end 14 through which a silver coated dielectric film 16 is inserted.

An inlet passage 24 for hydrogen sulfide containing gas sample is provided in the end 14.

A constant current source 18 is coupled to the silver coating 26 at each end of the film 16 by the leads 20, 22, the lead 20 having a resistor 34 in series therewith.

Leads 28, 30 connect the coated ends of the film 16 to a digital voltmeter 32.

The reaction between silver metal and hydrogen sulfide is utilized in this invention for quantitative analysis of the concentration of hydrogen sulfide in air or any gas mixture. The tolerable threshold limit, for humans, or MAK-value of hydrogen sulfide in air is 10 parts per million (15 mg/m$^3$). The present invention can detect $H_2S \approx$ one part per million in about 30 min. The silver is deposited as a thin film (about 2 cm $\times$ 6 cm $\times$ 300 Angstroms) on any dielectric substrate (glass or plastic plate), and the film electrical resistance is measured potentiometrically using a small measuring current (10 milliamperes, for example). Then $S = (A/R_o)([\Delta R/R_t])$, where S is proportional to the thickness of the silver sulfide layer; A, a constant, characteristic of the film dimensions; $R_o$, the initial resistance; $\Delta R$, the change of resistance; and $R_t$, the resistance at time $t$. It was found that S is a linear function of $H_2S$ concentration at a given time $t$. It was also found that sulfur dioxide or chlorine has no adverse effect on this measurement because of the limited exposure time.

Figure 2:
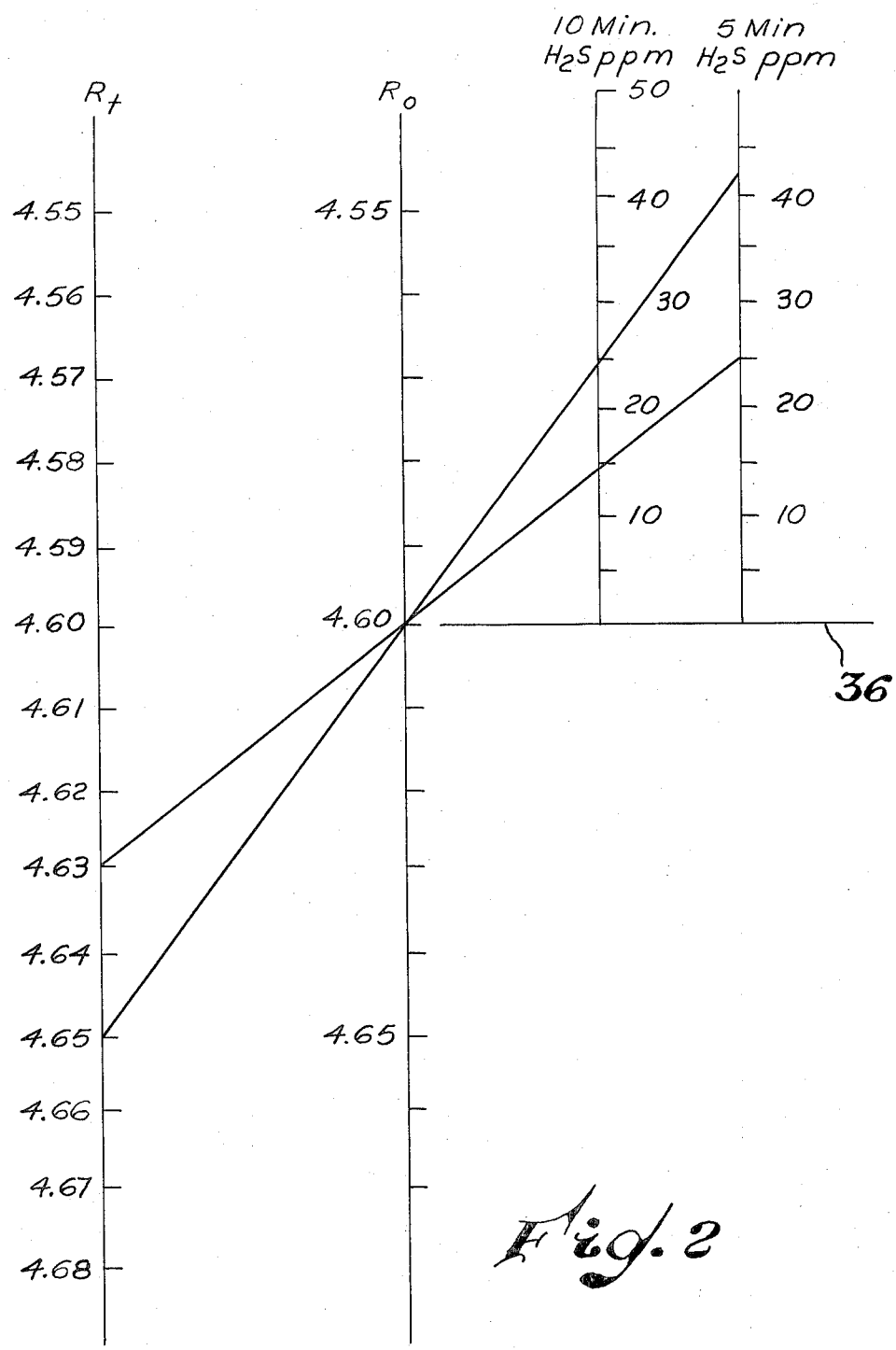
FIG. 2 is a chart adapted for use with the method of this invention.

The graphical representation shown in FIG. 2 illustrates that individual calculations are not necessary to determine the concentration of hydrogen sulfide present in the air.

The base line 36 is simply moved up or down to coincide with the initial film resistance value, $R_o$, and then a straight line is drawn through the final resistance value, $R_t$ and the $R_o$ value, and then extended to read the hydrogen sulfide concentration (based on the exposure time of the film). In FIG. 2, the Constant A is accounted for by the scale.

OPERATION

Referring to FIG. 1, the resistance of the coating 26 is measured at the start of the exposure to hydrogen sulfide to determine $R_o$. Since the voltage is supplied across the coating by the constant current source 18, the reading on the voltmeter is a function of resistance.

After the coating has been exposed to hydrogen sulfide for a predetermined time, the resistance of the coating (the voltage drop across the coating — a constant current being applied) is measured again to determine $R_t$. The $\Delta R$ then may be determined and the hydrogen sulfide concentration calculated (or FIG. 2 may be used).

If standardized coatings 26 are used, $R_o$ would be the same for all films 16 used. Thus, the only reading needed would be the $R_t$ or final reading. This $R_t$ reading, as may be seen from FIG. 2, and assuming a predetermined exposure to hydrogen sulfide, would be directly related to a discrete hydrogen sulfide concentration value.

It would be practical, then, to have the voltmeter scale read hydrogen sulfide concentration instead of voltage because there is a direct correlation.

From a practical standpoint, a precision resistor is usually substituted for the coating 26 in calibrating the constant current.

What is claimed is:

1. A method of measuring the concentration of hydrogen sulfide in a gas mixture at the level of a few parts per million or higher, comprising depositing a thin film of silver on a dielectric base element, measuring the electrical resistance across said film, chemically reacting any hydrogen sulfide in said mixture for a predetermined time, again measuring the electrical resistance across said film, and then calculating the hydrogen sulfide concentration in accordance with the formula $S = (A/R)([\Delta R/R_t])$ where S is a linear function of hydrogen sulfide concentration at a given time, $R_o$ is the initial resistance, $R_t$ is the resistance after exposure for a predetermined time, $\Delta R$ is the difference between $R_o$ and $R_t$, and A is a constant.

2. A method in accordance with claim 1, wherein said film of silver is about 300 Angstroms in thickness.

3. A method in accordance with claim 1, wherein said predetermined time is between 5 minutes and a half hour.

* * * * *

PO-1050
(5/69)

UNITED STATES PATENT OFFICE
CERTIFICATE OF CORRECTION

Patent No. 3,820,958     Dated June 28, 1974

Inventor(s) Chin Huan Cheng, Bruce C. Peters

It is certified that error appears in the above-identified patent and that said Letters Patent are hereby corrected as shown below:

Column 2, lines 20-21 should read:

$$S = A/R_o ( \Delta R/R_t ).$$

Column 3, line 11, the formula should read $$S = A/R_o ( \Delta R/R_t ).$$

Signed and sealed this 15th day of October 1974.

(SEAL)
Attest:

McCOY M. GIBSON JR.
Attesting Officer

C. MARSHALL DANN
Commissioner of Patents

PO-1050
(5/69)

UNITED STATES PATENT OFFICE
CERTIFICATE OF CORRECTION

Patent No. __3,820,958__     Dated __June 28, 1974__

Inventor(s) __Chin Huan Cheng, Bruce C. Peters__

It is certified that error appears in the above-identified patent and that said Letters Patent are hereby corrected as shown below:

Column 3, line 7, after "mixture" the words --with said film-- should be inserted.

Signed and sealed this 17th day of December 1974.

(SEAL)
Attest:

McCOY M. GIBSON JR.
Attesting Officer

C. MARSHALL DANN
Commissioner of Patents